(12) United States Patent
Buck et al.

(10) Patent No.: US 8,157,278 B2
(45) Date of Patent: Apr. 17, 2012

(54) REAR FASCIA INTEGRATED STEP LOAD SUPPORT

(75) Inventors: Robert A. Buck, Howell, MI (US); Scott L. Woods, Clinton Township, MI (US); William B. Zywicki, Jr., White Lake, MI (US); Julian F. Vanbiesbrouck, Grosse Point Farms, MI (US)

(73) Assignee: Magna International Inc., Aurora (CA)

( * ) Notice: Subject to any disclaimer, the term of this patent is extended or adjusted under 35 U.S.C. 154(b) by 28 days.

(21) Appl. No.: 12/746,587

(22) PCT Filed: Dec. 8, 2008

(86) PCT No.: PCT/CA2008/002129
§ 371 (c)(1),
(2), (4) Date: Jun. 7, 2010

(87) PCT Pub. No.: WO2009/070891
PCT Pub. Date: Jun. 11, 2009

(65) Prior Publication Data
US 2010/0259027 A1   Oct. 14, 2010

Related U.S. Application Data

(60) Provisional application No. 61/005,787, filed on Dec. 7, 2007.

(51) Int. Cl.
*B60R 3/00*   (2006.01)
(52) U.S. Cl. ........................................ 280/166; 293/117
(58) Field of Classification Search .................. 280/166, 280/163, 175, 762, 763.1, 770, 848, 850, 280/853, 854; 293/106, 117
See application file for complete search history.

(56) References Cited

U.S. PATENT DOCUMENTS

| | | | | |
|---|---|---|---|---|
| 3,140,891 A | * | 7/1964 | Shreffler | 296/1.08 |
| 3,807,757 A | * | 4/1974 | Carpenter et al. | 280/166 |
| 3,933,385 A | * | 1/1976 | Sanford et al. | 293/136 |
| 4,021,071 A | * | 5/1977 | Norman | 296/62 |
| 4,029,350 A | * | 6/1977 | Goupy et al. | 293/110 |
| 4,171,143 A | * | 10/1979 | Huber et al. | 293/121 |
| 4,264,084 A | * | 4/1981 | Telles | 280/166 |
| 4,765,665 A | * | 8/1988 | Akahoshi | 293/102 |
| 4,877,279 A | * | 10/1989 | Logan | 293/121 |
| 4,901,895 A | * | 2/1990 | Gancarz | 224/491 |
| 5,788,321 A | * | 8/1998 | McHorse et al. | 296/180.1 |
| 6,173,812 B1 | * | 1/2001 | Spivey et al. | 182/88 |
| 6,508,325 B1 | * | 1/2003 | Schwarz et al. | 180/167 |

(Continued)

FOREIGN PATENT DOCUMENTS

JP       09099790 A2    4/1997

(Continued)

*Primary Examiner* — John R Olszewski
*Assistant Examiner* — Brodie Follman
(74) *Attorney, Agent, or Firm* — Warn, Hoffman, Miller & LaLone, P.C.

(57) ABSTRACT

The present invention is an integrated step load support for a rear fascia of a vehicle which includes features that are molded in one orientation and folded and fastened in a support orientation. The features are integrated into the existing component configurations of the vehicle, and no additional parts are molded, assembled, or shipped to the customer location. The present invention includes the lower fascia having a molded and support structure which is attached to a main body through the use of living hinge features. The structure is then folded into a support position and locked into place with complimentary folding features molded into the upper fascia. The upper folding structure also incorporates an offset attachment surface without additional tooling action.

18 Claims, 9 Drawing Sheets

U.S. PATENT DOCUMENTS

| | | | | |
|---|---|---|---|---|
| 6,814,379 B2 * | 11/2004 | Evans | | 293/117 |
| 6,964,441 B2 * | 11/2005 | Ariga et al. | | 293/117 |
| 7,311,320 B2 * | 12/2007 | Kuntze et al. | | 280/163 |
| 7,354,102 B2 * | 4/2008 | Cave et al. | | 296/209 |
| 7,377,531 B2 * | 5/2008 | Fabiano et al. | | 280/163 |
| 7,377,564 B1 * | 5/2008 | Baffy et al. | | 293/117 |
| 7,506,906 B1 * | 3/2009 | DeHoff et al. | | 293/117 |
| 7,517,002 B2 * | 4/2009 | Reed et al. | | 296/146.7 |
| 7,527,308 B2 * | 5/2009 | Buniewicz et al. | | 293/117 |
| 7,722,098 B2 * | 5/2010 | Woods et al. | | 293/117 |
| 2004/0124644 A1 * | 7/2004 | Miller et al. | | 293/117 |
| 2006/0157992 A1 | 7/2006 | Sakamoto et al. | | |
| 2006/0267308 A1 * | 11/2006 | Decker et al. | | 280/166 |
| 2007/0085361 A1 * | 4/2007 | Hauser | | 296/1.08 |
| 2007/0145754 A1 * | 6/2007 | Tier et al. | | 293/109 |
| 2007/0228746 A1 * | 10/2007 | Cormier et al. | | 293/102 |
| 2009/0066119 A1 * | 3/2009 | Woods et al. | | 296/204 |
| 2009/0315345 A1 * | 12/2009 | Eckert et al. | | 293/117 |
| 2010/0109366 A1 * | 5/2010 | Dilley et al. | | 296/39.1 |
| 2010/0259027 A1 * | 10/2010 | Buck et al. | | 280/166 |

FOREIGN PATENT DOCUMENTS

| | | |
|---|---|---|
| JP | 2002036982 A2 | 2/2002 |
| WO | 2005021333 A1 | 3/2005 |

* cited by examiner

REAR FASCIA INTEGRATED STEP LOAD SUPPORT

CROSS-REFERENCE TO RELATED APPLICATIONS

This application claims the benefit of U.S. Provisional Application No. 61/005,787 filed on Dec. 7, 2007. The disclosure of the above application is incorporated herein by reference.

FIELD OF THE INVENTION

The present invention relates to a support structure used for supporting a step portion or load step area of a rear fascia of an automobile.

BACKGROUND OF THE INVENTION

Front and rear fascias are common components used in the assembly of the body of an automobile. Rear fascias not only provide an aesthetically pleasing appearance, they also can provide the contour and shape of the rear step portion or load step area of the vehicle. The step portion is used for supporting various loads by the users either entering or exiting the rear of the vehicle, as well as various items that are positioned on the step portion temporarily. Over time, various automotive manufacturers have increased the requirements for loading that is placed on the load step area of the rear fascia. One type of problem that has resulted from the increased loading requirements is that the load step area is not sufficiently supported with the small attachment brackets currently available as required by various automotive manufacturers. Additionally, it is considered highly undesirable to add additional components to provide the support for the load step area. Adding additional components increases cost and manufacturing time.

Accordingly, there exists a need for an improved type of load step area support which eliminates the need for the load step area support to be shipped and installed separately. There also exists a need to provide additional support for the load step area which minimizes component tooling and handling investments.

SUMMARY OF THE INVENTION

The present invention is an integrated step load support for a rear fascia of a vehicle which includes features that are molded in one orientation and folded and fastened in a support orientation. The features are integrated into the existing component configurations of the vehicle, and no additional parts are molded, assembled, or shipped to the customer location. The present invention includes the lower fascia having a molded and support structure which is attached to a main body through the use of living hinge features. The structure is then folded into a support position and locked into place with complimentary folding features molded into the upper fascia. The upper folding structure also incorporates an offset attachment surface without additional tooling action. The present invention includes an upper folding structure, as well as a lower folding structure operable for connection to a vehicle. The lower folding structure is also operable for connection with the upper folding structure such that when a load is applied to the upper folding structure, the upper folding structure and lower folding structure support the load.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
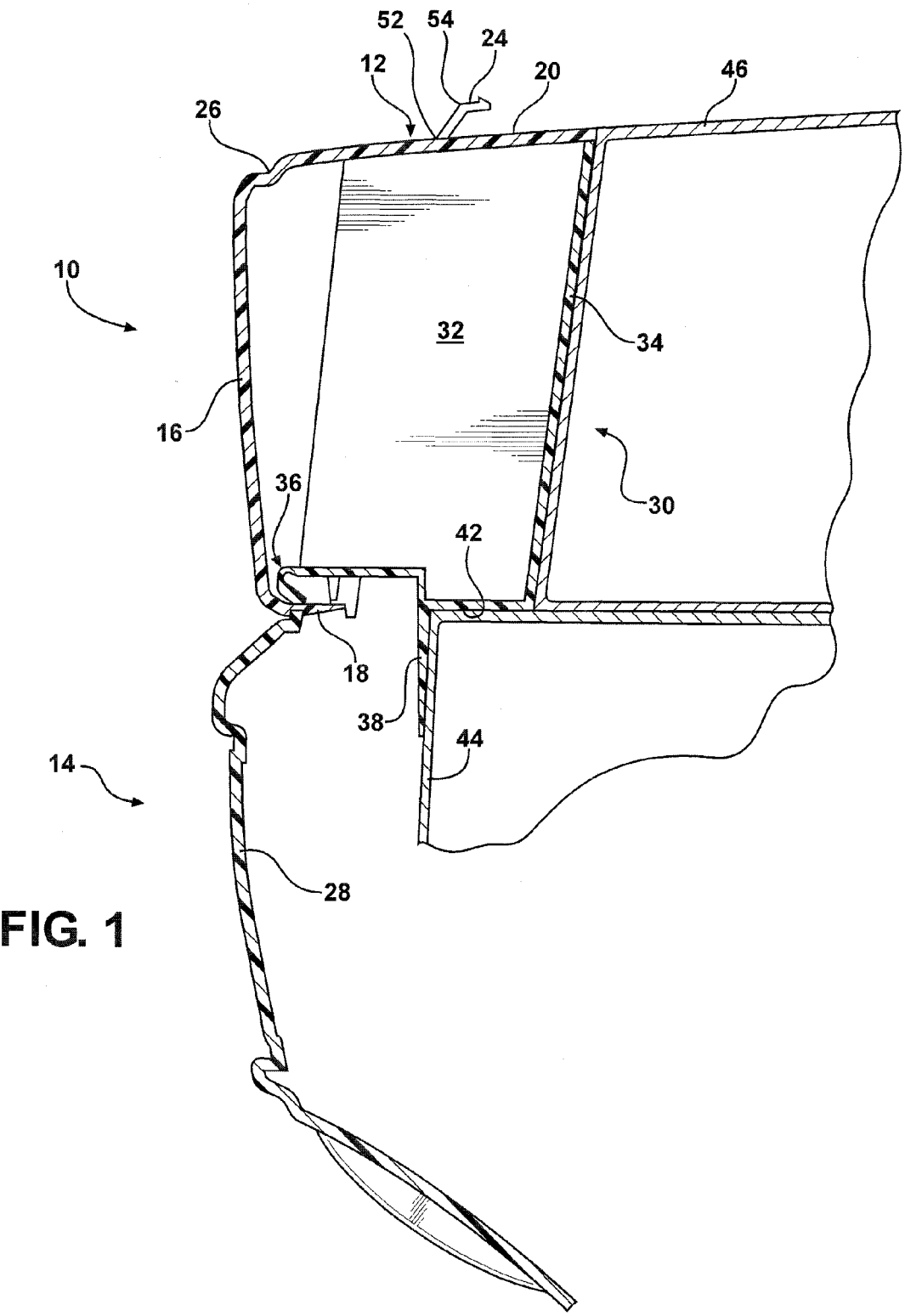
FIG. 1 is a sectional side view taken along lines 1-1 of FIG. 7 of a rear fascia integrated step load support, according to the present invention.

The following description of the preferred embodiment(s) is merely exemplary in nature and is in no way intended to limit the invention, its application, or uses.

Referring to the Figures generally, a step load support assembly for a rear fascia 56 of a vehicle 48 is shown generally at 10. The step load support 10 includes an upper folding structure or upper fascia portion, generally shown at 12 and a lower folding structure or lower fascia portion, generally shown at 14. The upper fascia portion 12 includes a body portion 16, a set of lower connecting flanges or tabs 18, and a foldable portion 20. While a section is shown in FIGS. 1-6, the body portion 16 and foldable portion 20 form a part of, and extend along the entire length of the fascia 56. The foldable portion 20 includes a pair of flanges 22, and a pair of upper connecting flanges or tabs 24. The foldable portion 20 is connected to the body portion 16 through the use of a first living hinge 26.

The lower folding structure 14 includes an outer member 28, and a foldable member, generally shown at 30. The lower folding structure 14, in particular the outer member 28, also forms a part of and extends along the entire length of the fascia 56. The foldable member 30 includes several support flanges 32, and support brackets 34. The foldable member 30 is connected to the outer member 28 through the use of a second living hinge, shown generally at 36. Also formed as part of the foldable member 30 is a set of elongated flanges 38, and the elongated flanges 38 are substantially perpendicular to a support surface 42. When the fascia 56 is attached to the vehicle 48, the support brackets 34 are positioned adjacent a bumper beam 46, which is part of the vehicle 48. The support surface 42 rests upon a frame 44 of the vehicle 48 such that a force or load applied to the foldable portion 20 will be transferred through the support flanges 32, support brackets 34, and the support surface 42 to the frame 44. The fascia 56 is attached to the vehicle 48 using a set of fasteners (not shown) which extend through a set of apertures 58 formed on the fascia 56 and into a set of corresponding apertures 60 formed on the vehicle 48.

Figure 2:
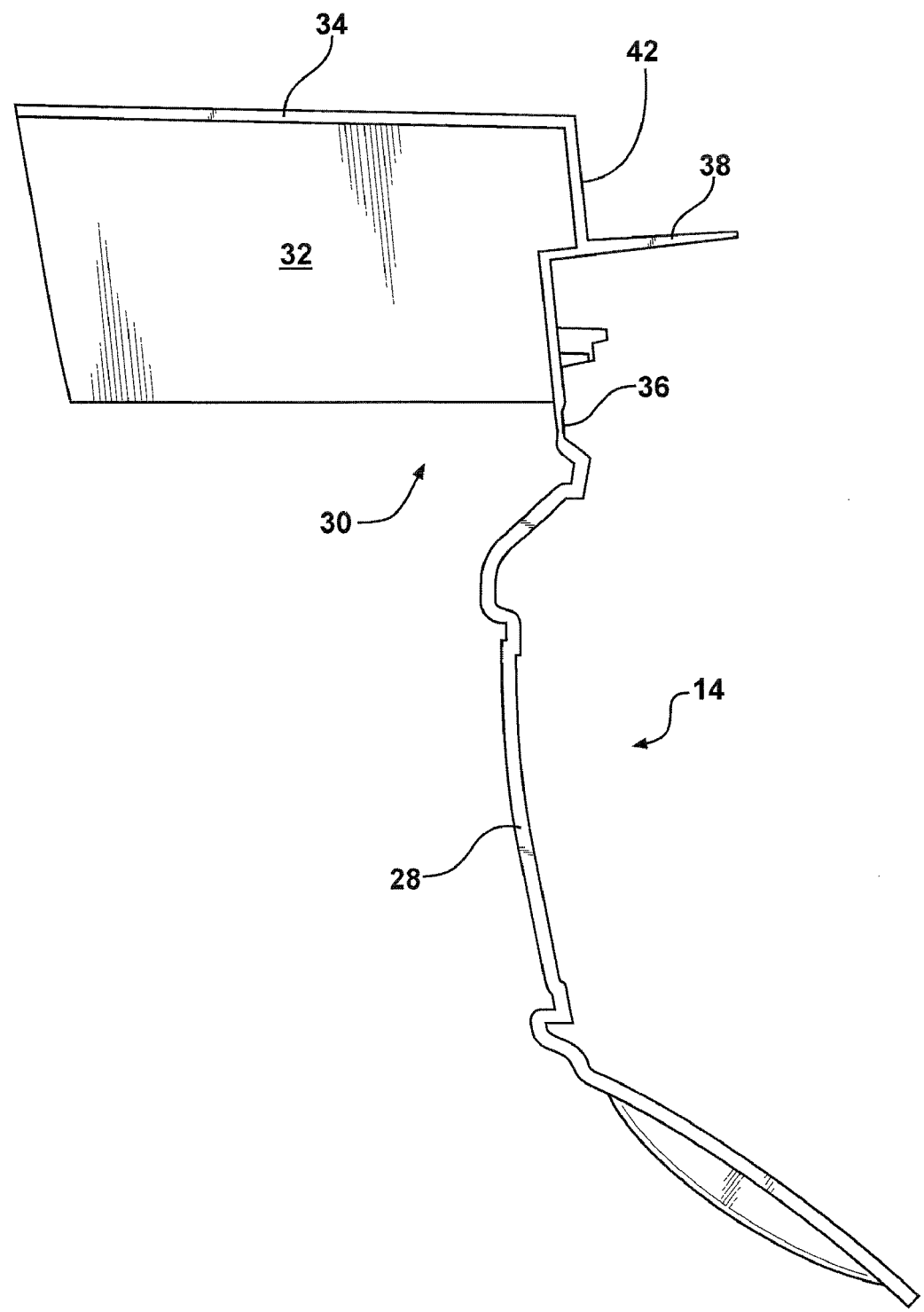
FIG. 2 is a sectional side view of a lower folding structure used in a rear fascia integrated step load support in a position after manufacturing, according to the present invention.
Figure 3:
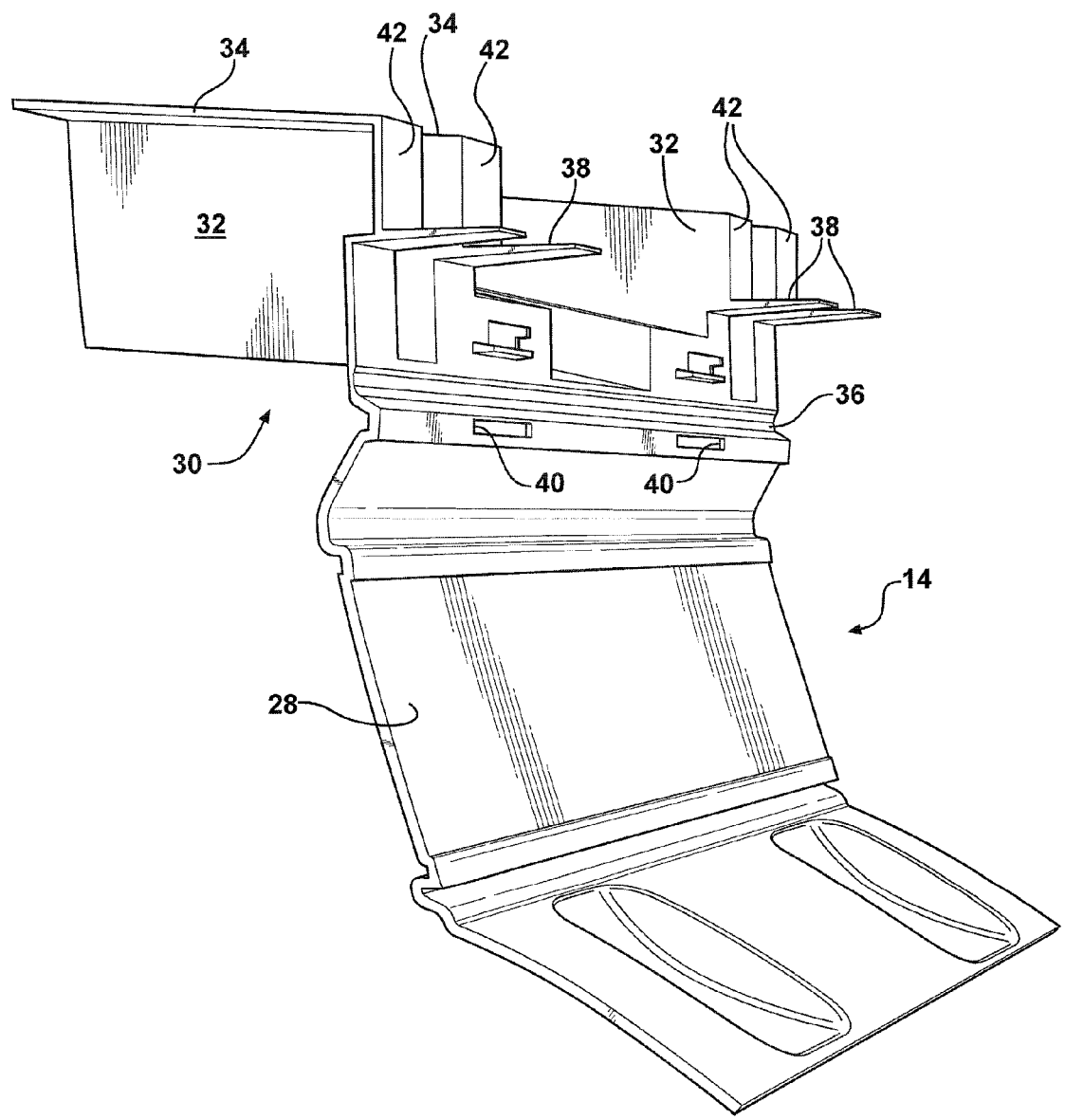
FIG. 3 is a perspective view of a lower folding structure used in a rear fascia integrated step load support in a position after manufacturing, according to the present invention.
Figure 4:
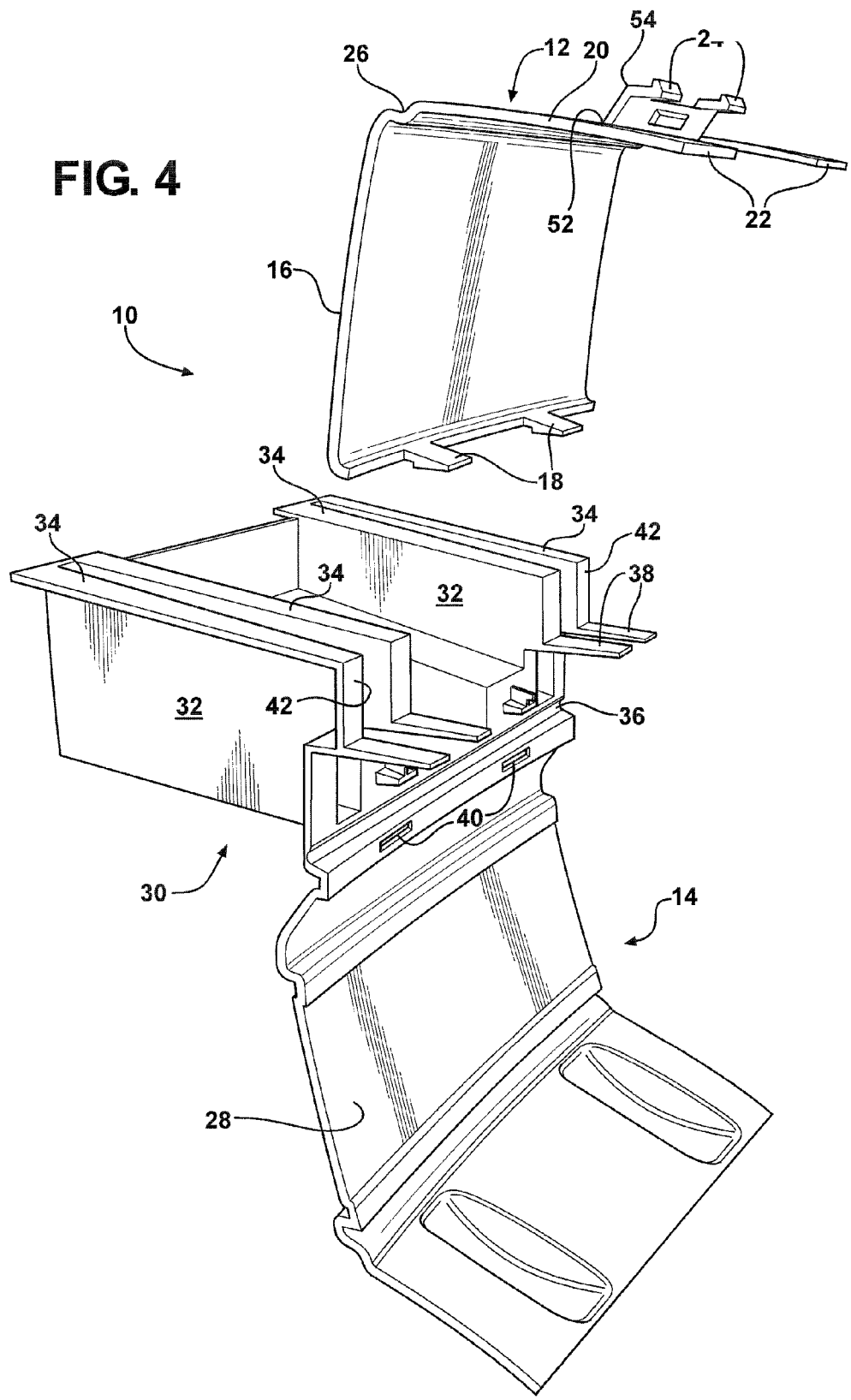
FIG. 4 is an exploded view of a lower folding structure in a position after manufacturing and an upper fascia used in a rear fascia integrated step load support, according to the present invention.
Figure 5:
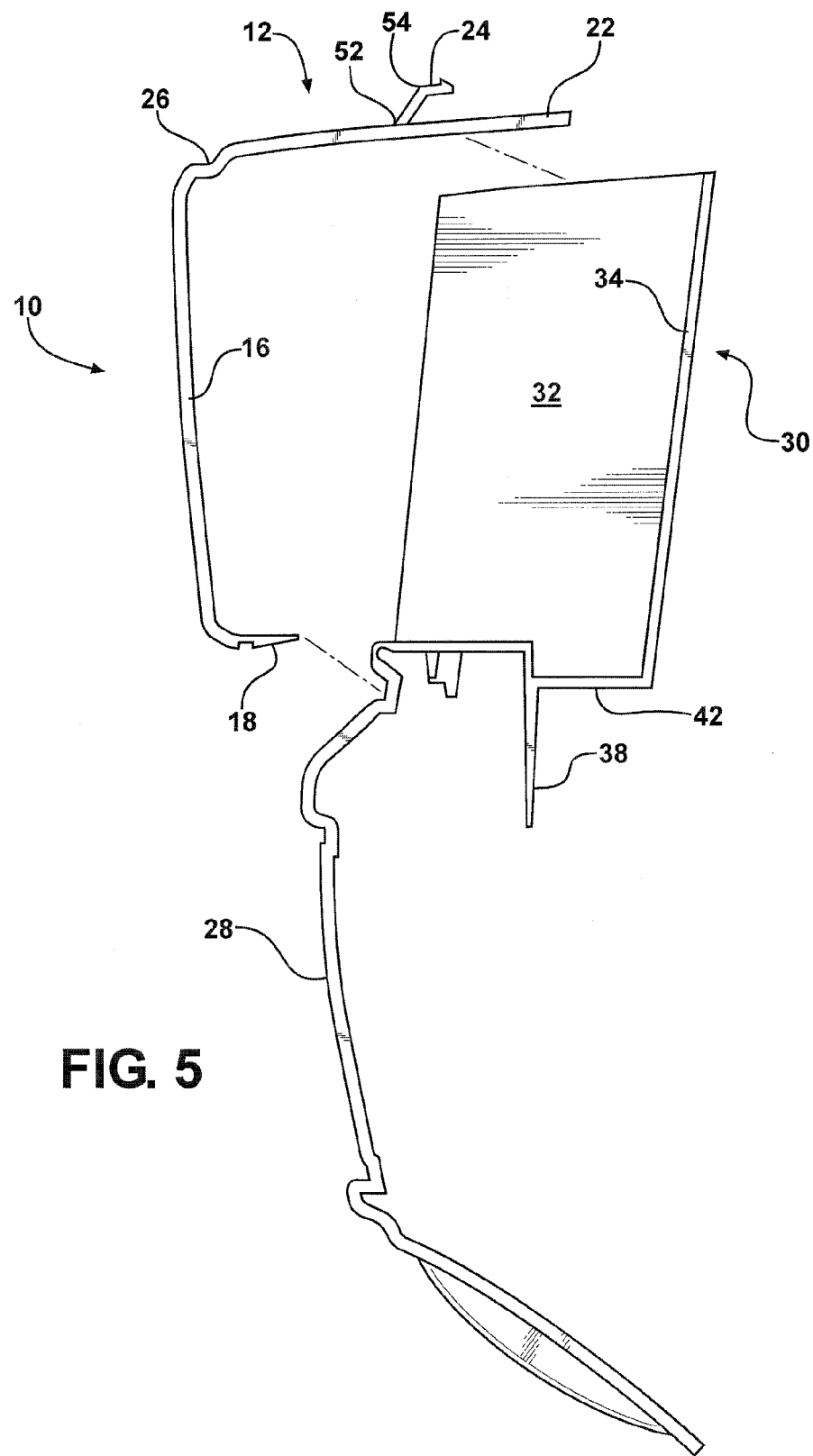
FIG. 5 is an exploded view of a lower folding structure and upper fascia used in a rear fascia integrated step load support, with the lower folding structure positioned in an installed position, according to the present invention.
Figure 6:
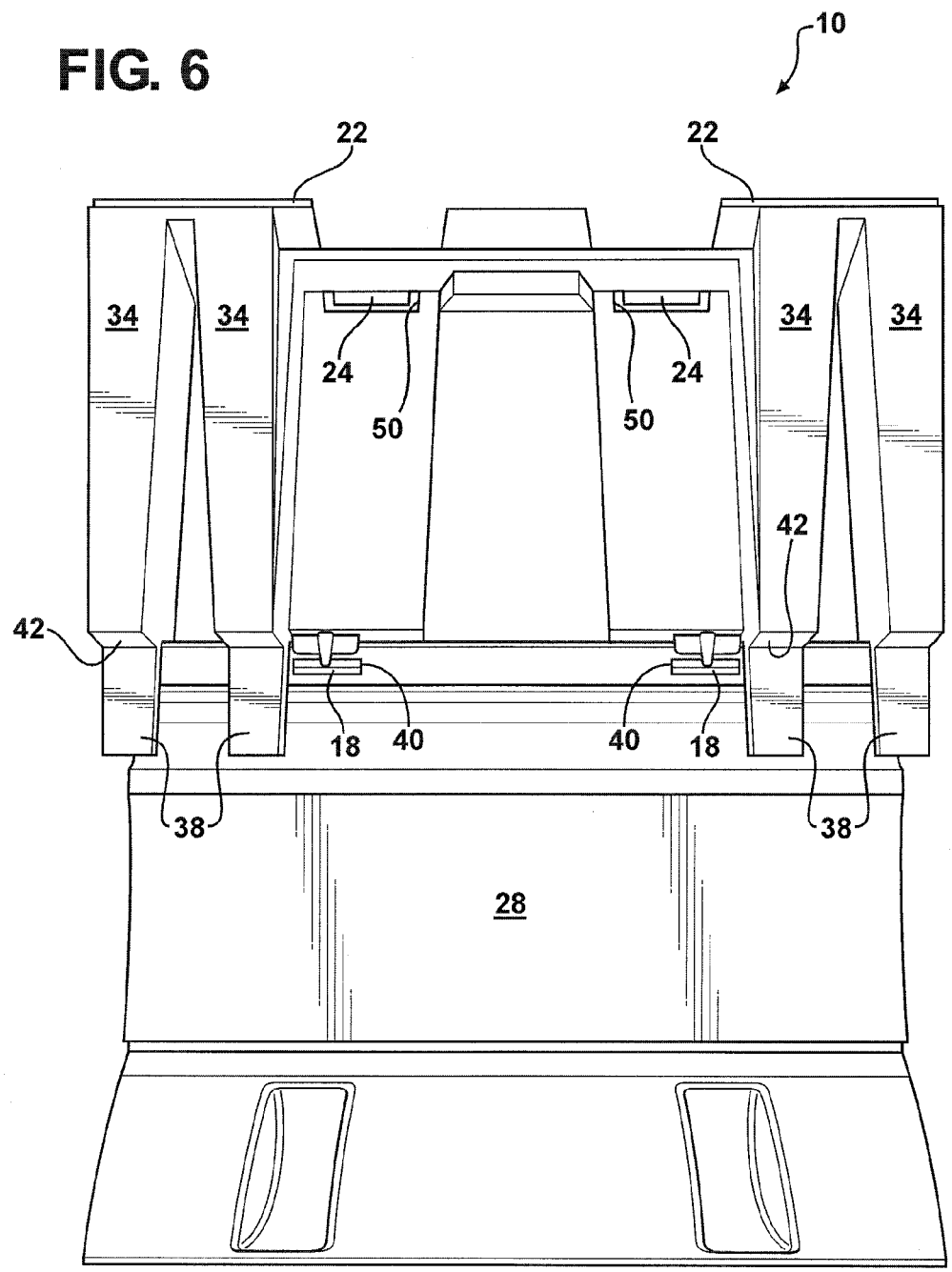
FIG. 6 is a rear view of a rear fascia integrated step load support, according to the present invention.
Figure 7:
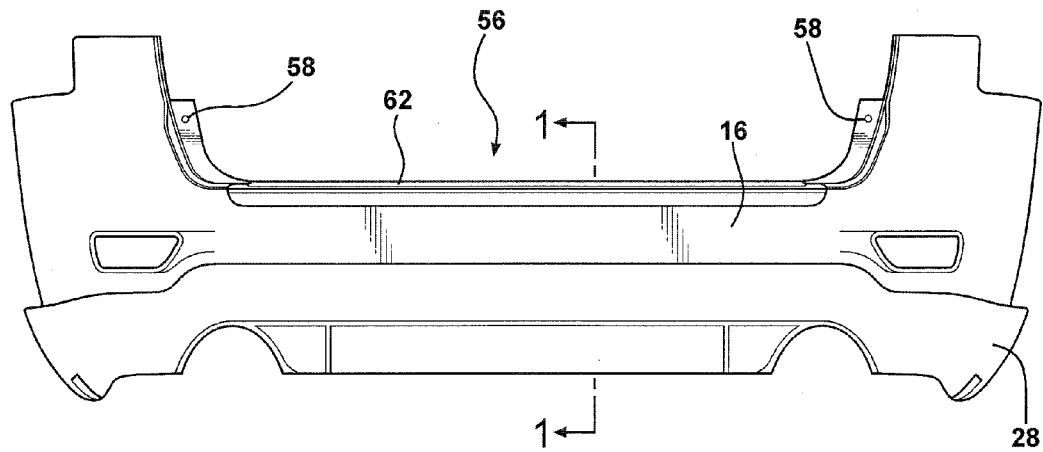
FIG. 7 is a front view of a fascia for a vehicle having a rear fascia integrated step load support, according to the present invention.
Figure 8:
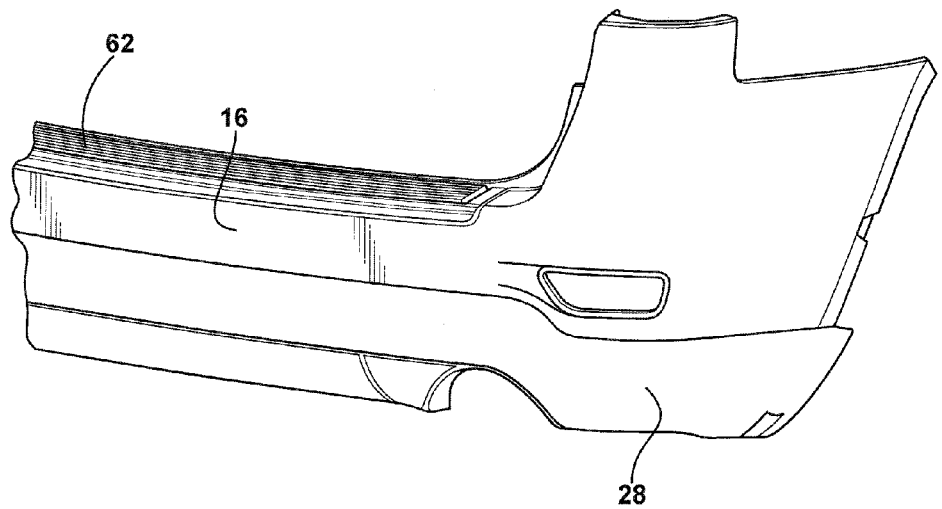
FIG. 8 is a perspective front view of a fascia for a vehicle having a rear fascia integrated step load support, according to the present invention.
Figure 9:
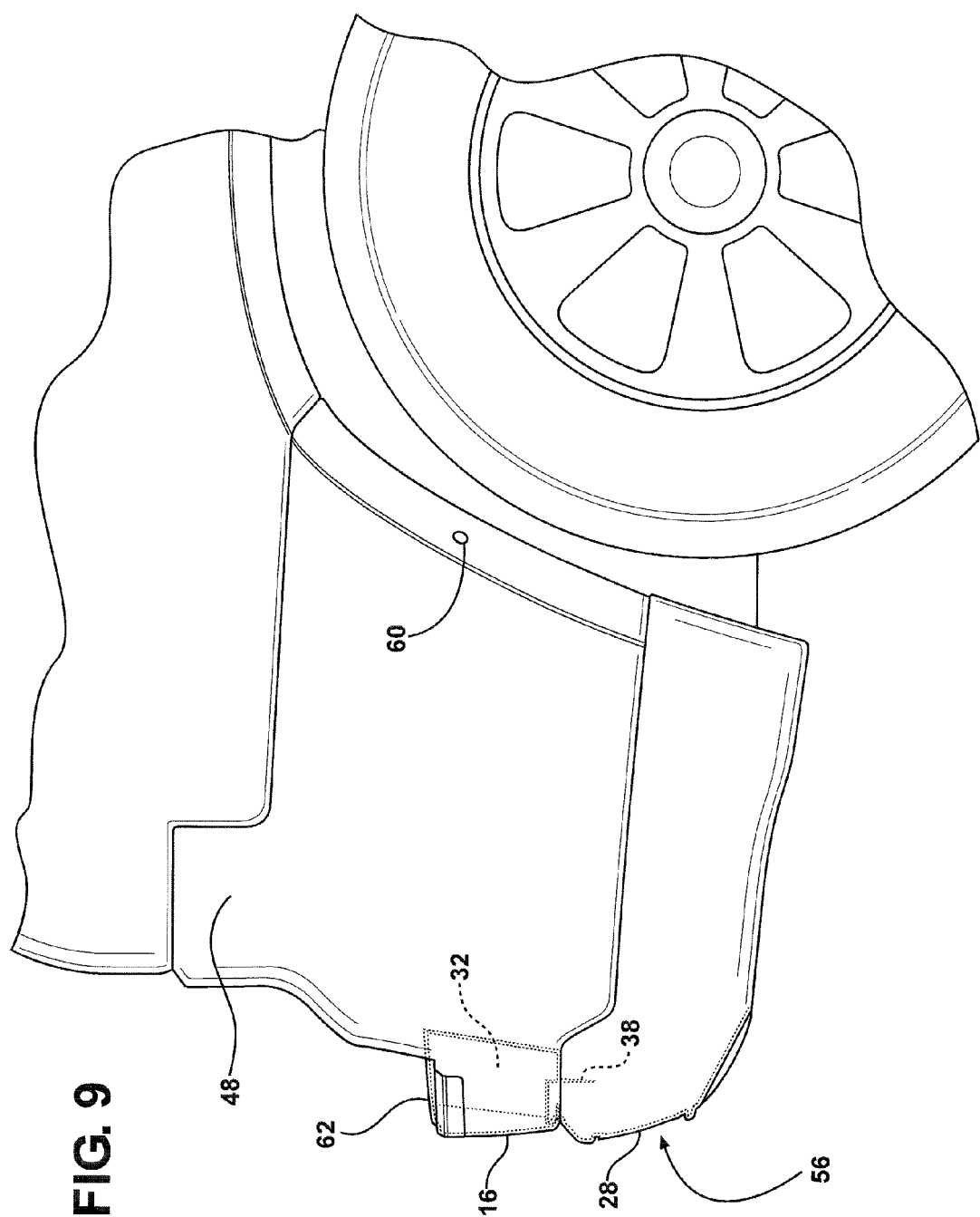
FIG. 9 is a side view of a vehicle having a rear fascia integrated step load support, according to the present invention.

During assembly, the lower folding structure 14 is folded along the second living hinge 36 from the position shown in FIGS. 2-4 to the position shown in FIGS. 1 and 5-6. The lower connecting flanges 18 of the body portion 16 are then inserted into a set of apertures 40 formed as part of the second living hinge 34. The upper connecting flanges 24 of the foldable portion 20 are operable to be folded about a third living hinge 52 and a fourth living hinge 54 and are inserted to a set of apertures 50 formed on the foldable member 30 to provide an additional connection between the upper folding structure 12 and the lower folding structure 14.

Once the upper folding structure 12 and the lower folding structure 14 are connected, the entire fascia 56 is connected to the vehicle 48 such that the elongated flanges 38 and the support surface 42 of the step load support 10 are placed adjacent to the frame 44, and the support brackets 34 are adjacent the bumper beam 46, as shown in FIG. 1.

Once assembled to the vehicle 48, a force may be applied to the foldable portion 20 vertically when looking at FIG. 1. The force is supported by the support flanges 32, the support brackets 34, as well as the body portion 16 of the upper fascia portion 12. The frame 44 in turn supports the flanges 32 and brackets 34. The support flanges 32 and support brackets 34 provide support and increased strength of the step load support assembly 10, which allows the step load support assembly 10 to support and increased amount of loading.

Figure 10:
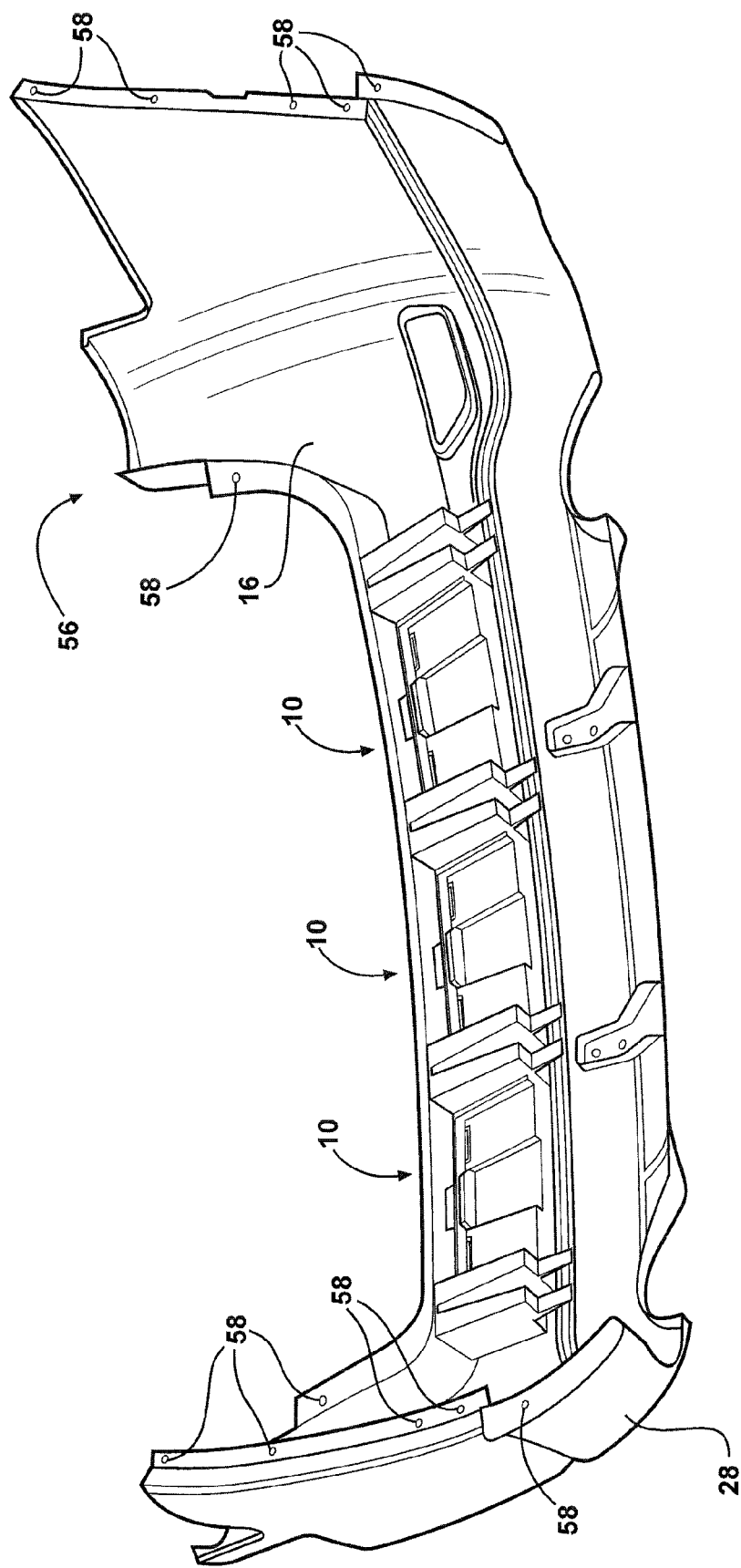
FIG. 10 is a rear perspective view of a rear fascia having a rear fascia integrated step load support, according to the present invention.

Also, the outer member 28 and the upper folding structure 12 have an aesthetically pleasing appearance such that the entire fascia 56 has a high gloss, or what is commonly known as a "class A" surface. Several step load supports 10 may be used along a vehicle for providing complete support from one end of the fascia to the other. While is it shown in FIG. 10 of this embodiment that there are three step load supports 10, it is within the scope of the invention that more or less step load supports 10 may be used for providing proper loading support for the rear fascia 56 of the vehicle 48. There is also a grip pad 62 placed on top of the foldable portion 20 which provides an improved grip when stepping on the fascia 56.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A step load support, comprising:
   an upper folding structure;
   a lower folding structure operable for connection to a vehicle, said lower folding structure operable for connection with said upper folding structure such that when a force is applied to said upper folding structure, said lower folding structure will provide support for said force;
   said upper folding structure further comprising:
      a body portion;
      a foldable portion foldably connected to said body portion, wherein said body portion is operable to be positioned relative to said foldable portion for connecting said upper folding structure to said lower folding structure; and
      a first living hinge operable for connecting said body portion to said foldable portion.

2. A step load support, comprising:
   an upper folding structure;
   a lower folding structure operable for connection to a vehicle, said lower folding structure operable for connection with said upper folding structure such that when a force is applied to said upper folding structure, said lower folding structure will provide support for said force;
   at least one aperture formed as part of said lower folding structure; and
   at least one connecting flange formed as part of said upper folding structure such that said at least one connecting flange is at least partially inserted into said at least one aperture, thereby connecting said upper folding structure to said lower folding structure.

3. A step load support, comprising:
   an upper folding structure;
   a lower folding structure operable for connection to a vehicle, said lower folding structure operable for connection with said upper folding structure such that when a force is applied to said upper folding structure, said lower folding structure will provide support for said force;
   said upper folding structure further comprising:
      an outer member; and
      a foldable member pivotally connected to said outer member such that said foldable member is moved to a position such that said foldable member is connected to a vehicle, said outer member receives a portion of said upper folding structure, and said foldable member is connected a part of said upper folding structure.

4. The step load support of claim 3, said foldable member further comprising at least one support flange formed as part of said foldable member such that when said force is applied to said upper folding structure, said support flange will support at least a portion of said force.

5. The step load support of claim 4, said foldable member further comprising at least one support bracket operable with said at least one support flange such that when a force is applied to upper folding structure, said at least one support bracket and said at least one support flange will support at least a portion of said force.

6. The step load support of claim 5, wherein said at least one support bracket and said support flange are support by a frame of a vehicle.

7. The step load support of claim 3, said foldable member further comprising a second living hinge operable for allowing said foldable member to move relative to said outer member.

8. A step load bracket, comprising:
   an upper folding structure having a body portion;
   a foldable portion formed as part of said upper folding structure, said foldable portion being foldable relative to said body portion;
   a lower folding structure having an outer member foldably connected to a foldable member, and said foldable member is placed into a position to allow said upper folding structure to be connected to said lower folding structure; and at least one support flange formed as part of said foldable member such that said at least one support flange supports said foldable portion of said upper folding structure when a force is placed upon said upper folding structure.

9. The step load bracket of claim 8, further comprising:

at least one upper connecting flange formed as part of said upper folding structure;

at least one lower connecting flange formed as part of said upper folding structure; and a plurality of apertures formed as part of said lower folding structure such that said at least one lower connecting flange and said at least one upper connecting flange are operable to be at least partially inserted into said plurality of apertures, thereby connecting said upper folding structure to said lower folding structure.

10. The step load bracket of claim 8, said upper folding structure further comprising a first living hinge operable for allowing said body portion to fold relative to said foldable portion.

11. The step load bracket of claim 8, further comprising at least one support bracket which provides additionally support of said foldable portion of said upper folding structure.

12. The step load bracket of claim 11, wherein said at least one support bracket and said at least one support flange are supported by a frame of a vehicle.

13. The step load bracket of claim 8, further comprising a second living hinge connecting said foldable portion to said outer member.

14. A step load support for a fascia of a vehicle, comprising:

an upper folding structure having a body portion foldably connected to a foldable portion;

at least one upper connecting flange formed as part of said foldable portion;

at least one lower connecting flange formed as part of said body portion;

a lower folding structure having an outer member foldably connected to a foldable member;

a plurality of apertures formed as part of said lower folding structure such that said foldable member is folded into a position to allow at least a portion of said at least one lower connecting flange to be received into one of said plurality of apertures, and at least a portion of said at least one upper connecting flange to be received into one of said plurality of apertures, thereby connecting said upper folding structure to said lower folding structure; and at least one support flange formed as part of said foldable member such that said at least one support flange will support said foldable portion of said upper folding structure when a force is placed upon said upper folding structure.

15. The step load support for a vehicle of claim 14, further comprising a first living hinge, wherein said body portion of said upper folding structure is connected to said foldable portion through the use of said first living hinge.

16. The step load support for a vehicle of claim 14, said foldable member of said lower folding structure further comprising at least one support bracket which supports said foldable portion of said upper folding structure when said upper folding structure is connected to said lower folding structure.

17. The step load support for a vehicle of claim 16, wherein said at least one support bracket and said at least one support flange are supported by a frame of a vehicle.

18. The step load support for a vehicle of claim 14, further comprising a second living hinge connecting said foldable portion to said outer member.

* * * * *